Patented Apr. 9, 1940

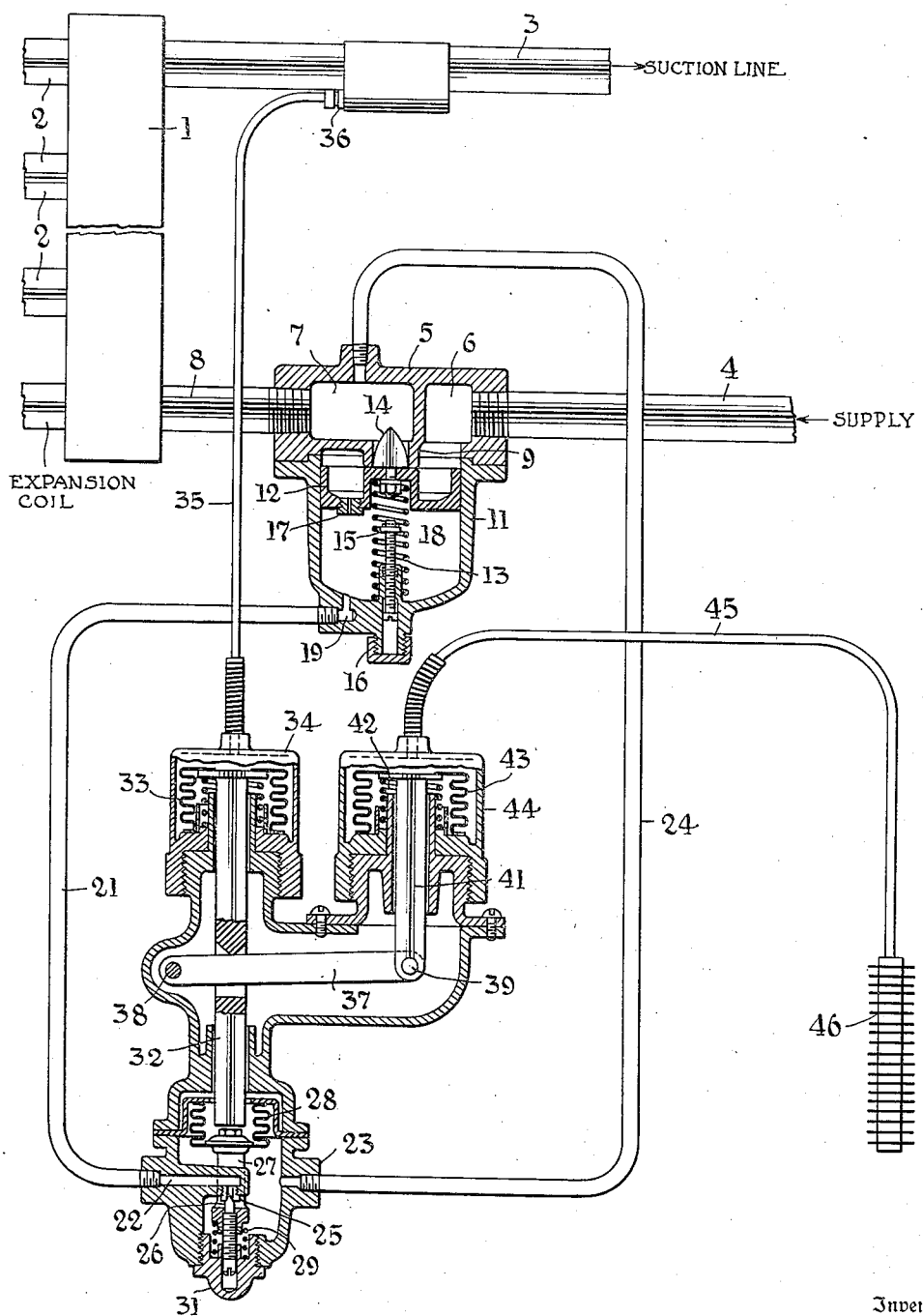

2,196,777

UNITED STATES PATENT OFFICE 2,196,777

REFRIGERANT EXPANSION CONTROL

Carl A. Otto, Milwaukee, Wis., assignor to Johnson Service Company, Milwaukee, Wis., a corporation of Wisconsin Application August 9, 1939, Serial No. 289,307

2 Claims. (Cl. 62—8)

This invention relates to refrigeration, and particularly to the control of the refrigerative effect of an evaporator in response to the temperature of a space cooled by the refrigerative action of said evaporator.

In the prior Patent No. 2,019,724, issued November 5, 1935, I describe and claim a thermostatic expansion valve in which the valve may be loaded in a closing direction in response to reduction of temperature. In Figure 2 of that patent, there is illustrated the use of a direct-acting thermostat of the type comprising a bulb filled with expansible liquid and connected to operate a bellows motor against spring resistance.

Experience with valves of this type has demonstrated that it is difficult to control with the desired degree of precision an expansion valve of substantial size, unless the bulb of the space thermostat be of unduly large size as compared to the thermostatic valve.

The purpose of the present invention is to permit the use of an expansion valve of the type described and claimed in my prior patent and particularly the embodiment of Figure 2 of that patent to control a large flow of refrigerant without requiring the use of a space thermostat of substantial size.

The invention contemplates the use of a booster valve controlled by a thermostatic expansion valve, the booster valve controlling a large flow of refrigerant to the evaporator, the expansion valve being of quite small size and merely controlling the booster valve. In this way, a space thermostat of small size may be used to control a large evaporator and the space thermostat may be made much smaller than it could possibly be if the thermostatic valve itself controlled the entire flow of the refrigerant.

One practical embodiment of the invention is shown in the accompanying drawing.

In that drawing, a header 1 is connected to the tubes 2 of a refrigerative evaporator of any suitable form. Connected to the upper end of this header is the suction line 3 which leads to a compressor or the like forming a part of a compressor, condenser, evaporator circuit. 4 represents the high pressure liquid line of such a circuit. The compressor, or its equivalent, the condenser, and receiver if used, may be conventional and are not illustrated.

Mounted in the liquid line 4 in advance of its connection with the header 1 is a booster valve comprising a body 5. The liquid line 4 enters a chamber 6 and the refrigerant flowing to the evaporator passes from a chamber 7 through an extension 8 of the liquid line directly into the header 1. Interposed between the chambers 6 and 7 is a valve seat member 9. Mounted below and connected to the housing 5 is a housing 11 forming a cylinder closed at its lower end and open at its upper end to the chamber 6.

A cup-like piston 12 is mounted to reciprocate in the cylinder so that it is subject on its upper face to supply pressure in the chamber 6. This piston 12 is held upward against the downward thrust of such pressure by a coil compression spring 13. The piston carries on its upper face a valve head 14 of conoidal form as shown, arranged to enter through the valve seat 9 and to perform a throttling effect on flow from the chamber 6 to the chamber 7, the degree of throttling varying with the vertical position of the piston 12.

The range of downward motion of the piston 12 is limited by an adjustable stop 15 which takes the form of a bolt threaded through the lower portion of the housing 11 and sealed against refrigerant leakage by means of a closure cap 16. Mounted in the piston 12 is an interchangeable choke 17. The flow capacity of the choke is adjusted by interchanging chokes of different sizes, the capacity being selected on principles which will be explained hereinafter.

Since the presence of the choke contemplates the passage of a certain amount of refrigerant from the chamber 6 through the choke 17, to the space 18 below the piston and within the housing 11, it is possible to fit the piston 12 rather freely in the cylinder so that its friction will be as small as possible. This contemplates possible leakage between the piston and the cylinder, and if such leakage can occur, the capacity of the choke 17 must be reduced to compensate.

Leading from a port 19 which communicates with the space 18 is a tube 21 which leads to the inlet port 22 of an expansion valve of the type described and claimed in my prior patent, above-identified. The discharge connection 23 of that valve is connected by a pipe 24 with the chamber 7. However, this connection can as well be made directly to the header which is in free communication with chamber 7. In fact, it can be made at any point in the circuit which is at evaporator suction pressure.

The construction of the expansion valve is fully set forth in my patent above-identified and only a brief description sufficient to enable one to understand the operation need be here given. The inlet connection 22 leads to a seat 25 for a needle valve 26. This needle valve is adjustably threaded in a yoke 27 which straddles the inlet connection 22 and which is connected to the center of the head of a bellows diaphragm 28 whose upper end is sealed to the walls of the valve chamber. Thus, suction pressure operates on the bellows 28 in a valve closing direction. The force so developed is augmented by a spring 29 which encircles the shank of the needle valve 26 and reacts against the yoke above mentioned. It will be observed that the shank of the needle valve works in a guideway in cap 31 and thus maintains the alignment of the valve.

There is a thrust stem 32 which can react, in a downward direction only, against the yoke 27 at its point of connection with the diaphragm 28. The upper end of the stem 32 reacts against the upper end of a bellows motor 33 whose lower end is connected to a portion of the housing. The upper end is closed. This bellows motor is enclosed in a gas-tight case 34, the interior of which is connected by a tube 35 with a thermostatic bulb 36 mounted in heat exchanging relation with the suction line. Pivoted within the casing and extending through a slot in the stem 32 in such a way that it can react on said stem only in an upward direction (i. e., a direction to oppose motor 33) is a loading arm 37. This is pivoted at 38 to a portion of the housing and is pivoted at 39 to a stem 41. The stem 41 is urged upward, that is, in a valve closing direction by a coil compression spring 42 which reacts between a portion of the housing and a flange on the upper end of the stem 41.

A bellows motor 43 closed at its upper end overlies the upper end of the stem 41 and is in thrust relation therewith. The lower end of the bellows motor 43 is sealed to a portion of the housing. A casing 44, encloses the belows motor and is connected by a tube 45 with a thermostatic bulb 46 which contains an expansible fluid and is mounted in a space cooled by the refrigerative effect of an evaporator 1, 2. Thus, on rising space temperature, expansion of the liquid bulb 41 develops downward pressure on bellows 43 and thus neutralizes in greater or less degree the stress of the spring 42. From this it follows that the valve 26 shifts in a closing direction in a degree which increases as space temperature falls. However, the parts 37 to 46 can never exercise a positive valve opening force on the valve 26. The thermostat may increase the closing bias of the valve, but it can never augment the opening tendency thereof because of the one-way thrust relationship between the lever 37 and the thrust stem 32.

This principle is fully developed in my prior patent and need not be elaborated. It may also be remarked that the patented structure includes a number of adjustments, the purpose of which is fully explained and whose presence is indicated in the drawing of the present application. It is deemed unnecessary, however, to elaborate these features.

When the device is in operation, liquid refrigerant flows at a very restricted rate past the piston 12, partly through the choke 17 and around the piston 12. The valve 26 supplies this refrigerant to the evaporator and consequently to the suction line by way of pipe 24, extension 8, header 1. The rate at which flow occurs past the valve 26 is such that refrigerant flowing from the header 1 to the suction line 3 will always be slightly superheated. When space temperature falls, the thermostatic bulb 46 loads the expansion valve in a closing direction. The effect is to increase the superheat.

Since the rate of flow past piston 12 is constant and the rate of flow past the valve 26 is variable, the pressure below the piston in the chamber 18 will vary, becoming lower as the valve 26 opens. Thus, as the valve 26 opens in response to the dual thermostatic control above described, the valve 14 will open similarly. Consequently, the thermostatic expansion valve pilots the booster valve mounted in the housing 5 with the result that a very small flow of refrigerant past the valve 26 controls a very much larger flow past the valve 14. At all times, the total rate of supply to the evaporator is such as to maintain some degree of superheat so that slugging of liquid into the compressor is precluded.

The mechanism within the housing 5 is the invention of another and no novelty is here claimed on the basis of that mechanism alone, the invention residing in the combination of a booster valve or its equivalent with the thermostatic expansion valve of the space temperature control type. Other boosters are known and may be used.

The thermostatic expansion valve is capable of considerable modification and other types responsive to space temperature have been proposed and may be substituted. Consequently, the device illustrated is to be taken as illustrative and not limiting.

The scope of the invention will be defined exclusively in the claims.

What is claimed is:

1. In a refrigerating system the combination of means for supplying liquid refrigerant under pressure; an evaporator; a suction line leading from the evaporator; a main expansion valve for controlling the main supply of refrigerant from the liquid supply to the evaporator; yielding means biasing said valve in a closing direction; a double-acting pressure motor having a movable abutment connected to actuate said valve and separating two working spaces, one of which is conected with the liquid supply so that the pressure of supply urges the abutment in a valve opening direction; a connection for supplying liquid refrigerant from the supply to the other working space at a restricted rate; a second pressure operated valve controlling a connection from the second working space to the evaporator and subject in a closing direction to evaporator pressure; means for urging said second valve in an opening direction; a thermostat subject to the temperature of a space cooled by said evaporator; and a motor controlled by said thermostat and connected to increase the effective closing force of said second valve in response to falling space temperature.

2. The combination defined in claim 1 in which the means urging said second valve in an opening direction is a thermostatic motor subject to temperature in the suction line arranged to develop an opening force on the second valve in proportion to such temperature.

CARL A. OTTO.